Aug. 20, 1929.  H. L. ALBERTSON  1,725,043
TRACTOR WHEEL
Filed Nov. 5, 1927  2 Sheets-Sheet 1
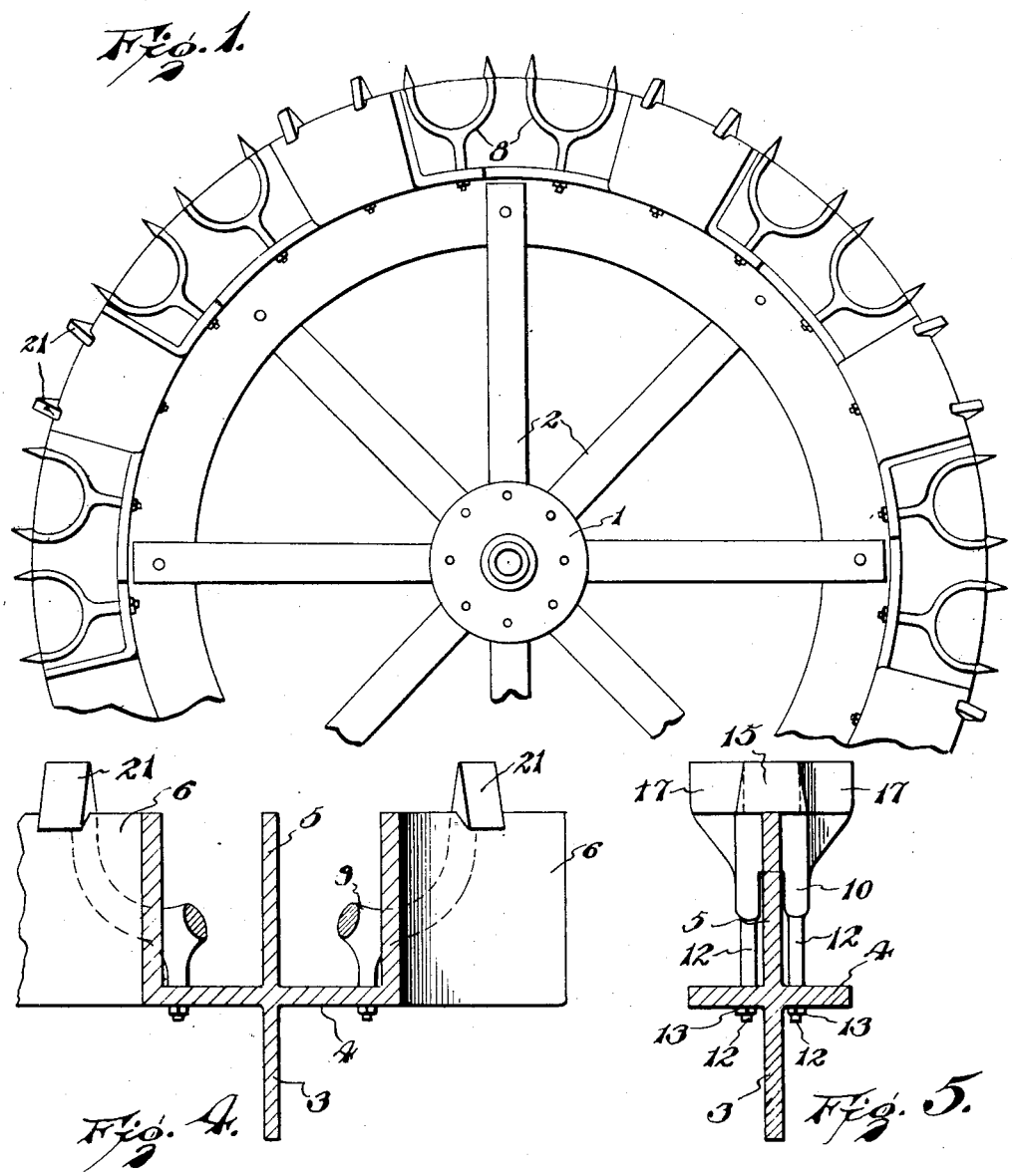
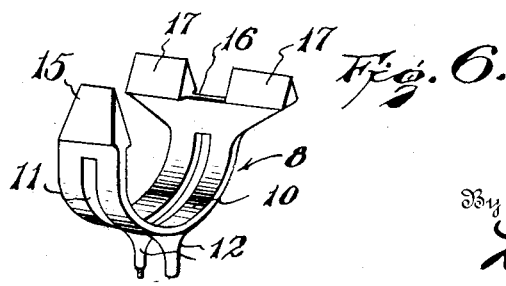
Inventor
H. L. Albertson
By Lacey & Lacey, Attorneys

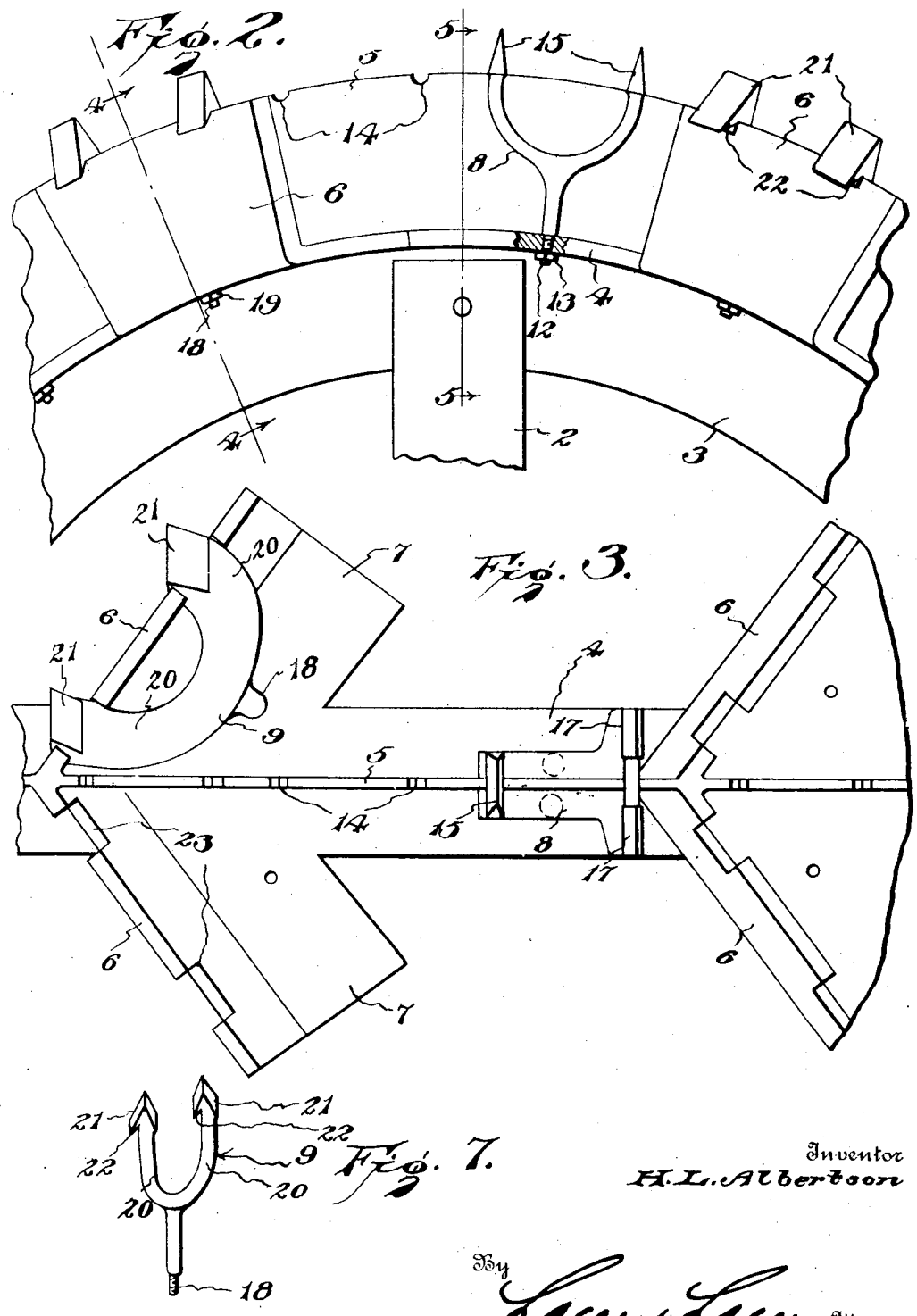

Patented Aug. 20, 1929.

1,725,043

UNITED STATES PATENT OFFICE.

HORATIO L. ALBERTSON, OF GREEN CASTLE, MISSOURI.

TRACTOR WHEEL.

Application filed November 5, 1927. Serial No. 231,254.

This invention relates to vehicle wheels and more particularly to a wheel of the tractor type having an improved rim construction and carrying improved ground-engaging cleats.

One object of the invention is to provide the wheel with a rim having an improved arrangement of ribs so disposed with respect to the rim that the wheel will be very effectively prevented from slipping upon muddy or hard ground.

Another object of the invention is to so form the rim that ribs extending transversely from a circumferentially extending rib will be reinforced and their outer portions prevented from being easily broken.

Another object of the invention is to provide the wheel with improved cleats which are removable therefrom so that they may be easily sharpened or new ones substituted if necessary.

Another object of the invention is to securely but releasably fasten the cleats to the rim and engage them with the ribs in such a manner that they will be firmly held in proper relation to the ribs with portions projecting therefrom radially of the wheel and constituting lugs to bite into the ground.

The invention is illustrated in the accompanying drawings, wherein

Figure 1 is a view in side elevation showing a portion of the wheel;

Fig. 2 is an enlarged fragmentary view showing a portion of the wheel in side elevation;

Fig. 3 is a top plan view of the portion of the wheel shown in Fig. 2;

Fig. 4 is a sectional view taken on the line 4—4 of Fig. 3;

Fig. 5 is a sectional view taken on the line 5—5 of Fig. 2;

Fig. 6 is a perspective view of a cleat carried by the circumferentially extending rib of the wheel, and Fig. 7 is a perspective view of one of the cleats carried by the transversely extending ribs of the wheel.

The improved wheel constituting the subject-matter of this invention includes a hub 1 from which extend spokes 2 having their outer ends secured to an annular web 3 extending inwardly from the rim 4. The rim 4 not only carries an inwardly extending annular web 3 but also carries an outwardly extending annular web or rib 5 and side ribs 6 which extend diagonally from the rib 5. The ribs 6 are of greater length than the distance between the rib 5 and the marginal edges of the rim so that they project transversely from the rim, and in order to reinforce the projecting portions of the side ribs and prevent them from being easily broken, there have been provided side extensions 7 formed integral with the rim and lower edges of the projecting portions of the side rib. By referring to Fig. 3, it will be seen that this construction greatly reinforces the side ribs and prevents them from being easily broken when going over hard or stony soil. In view of the fact that the rim 4, web 3 and the ribs 5 and 6 together with the side extension 7 of the rim may be formed as a unitary structure, the body portion of the wheel rim may be cheaply produced and at the same time will be strong and durable. It will be understood, however, that, if so desired, the elements constituting the body of the wheel rim may be formed separate and suitably secured together.

In order to permit the wheel to have very good biting engagement with hard ground, I have provided cleats 8 and 9 which are carried, respectively, by the annular rib 5 and side ribs 6. These cleats are formed of strong metal, such as steel, and, therefore, will stand a great deal of wear without being broken or quickly worn out and they are releasably secured to the rim so that they may be removed when it is necessary to repair them or substitute new ones for cleats which have been worn out.

The cleats 8 are formed as shown in Fig. 6, and each includes a U-shaped body portion 10 having a slot 11 formed therein to receive the rib 5 and threaded stems 12 extend from the body at opposite sides of the slot to be passed through the rim and receive nuts 13, as shown in Fig. 5, so that the cleat may be securely but releasably held in engagement with the rim. Recesses or seats 14 lead from the outer edge face of the rib 5 and are adapted to receive the end portions of the arms of the cleat, and by referring to Figs. 2 and 3 it will be readily seen that when the cleat is applied to the annular rib and the securing nuts tightened the cleat will be held against movement circumferentially or transversely of the rim and cannot move out of its proper position relative to the rim and annular rib. It should also be noted that one arm of the cleat has its end portion tapered to provide a lug 15 which projects radially from the annular rib and the other arm of the cleat has its end portion widened and formed with a recess 16 which divides this widened end portion of the cleat arm into lugs 17 spaced from opposite sides of the annular rib. Therefore, the lugs 15 and 17 define the points of a triangle, as shown in Fig. 3, and as the wheel turns when moving along the ground the lugs will very effectively bite into the ground.

The cleats 9 are each formed, as shown in Fig. 7, and by referring to this figure it will be seen that each cleat consists of a strip of steel or other strong metal bent to assume a U-shape and carrying a threaded stem 18 to be passed through an opening formed in the rim and receive a securing nut 19. The arms 20 of the cleat bear against a side face of the rib 6 adjacent which the cleat is secured and the end portions of the arms are wedge-shaped, as shown in Figs. 2 and 7, to provide lugs 21 which extend outwardly from the transverse rib and are formed with bills 22 to pass through recesses or seats formed in the transverse rib and engage the other side face of the rib. By having the bills pass through the seats 23 and engage with the rib 6 at the opposite side thereof from the body portion of the cleat, the cleat will be securely held in engagement with the side rib when the securing nut 19 is tightened and will be prevented from moving out of its proper position either circumferentially or transversely of the rim. I have, therefore, provided the wheel rim with a circumferentially extending rib carrying cleats having lug extensions to bite into the ground and side ribs extending diagonally from opposite sides of its circumferentially extending rib and carrying cleats having lug forming portions projecting from the ribs to bite into the ground.

Having thus described the invention, I claim:

1. In combination with a tractor wheel including a rim and a rib extending outwardly from the rim and having its outer portion provided with seats spaced from each other longitudinally of the rib and opening through the outer edge thereof, a ground-engaging cleat having a slotted U-shaped body straddling said rib with the rib fitted into the slot and the arms of the body extending along the rib towards the outer edge thereof, the outer portions of the arms being seated in said seats and projecting from the rib, one end portion being of increased width and recessed to provide spaced lugs at opposite sides of the rib and the other end portion constituting a lug opposite the recess, and stems extending from said body and secured in openings formed in the rim at opposite sides of the rib.

2. In combination with a tractor wheel including a rim and a rib extending outwardly from said rim and having its outer portion provided with seats spaced from each other longitudinally of the rib, a ground-engaging cleat having a U-shaped body and a stem extending therefrom and secured to said rim adjacent said rib, the arms of said cleat extending along the rib towards the outer face thereof and projecting from the rib to provide lugs to bite into the ground, said cleat having portions received in said seats to retain the cleat in operative engagement with the rib.

3. A ground-engaging cleat for tractor wheels comprising a U-shaped body having a longitudinally extending slot formed intermediate its width and terminating in spaced relation to the ends of its arms, said arms having their outer ends provided with heads constituting lugs adapted to bite into the ground, and stems extending from said body at opposite sides of the slot and adapted to be secured to a wheel rim at opposite sides of a rib extending from the rim and received in the slot of the cleat.

4. A ground-engaging cleat for tractor wheels comprising a U-shaped body having its arms terminating in heads constituting ground-engaging lugs, and a stem extending from said body and adapted to be secured to a wheel rim whereby the cleat may be secured to the rim of a wheel with its arms extending outwardly along a rib carried by the rim and the lugs projecting from the outer edge of the rib.

In testimony whereof I affix my signature.

HORATIO L. ALBERTSON. [L. S.]